US012770519B2

(12) United States Patent
Lei

(10) Patent No.: US 12,770,519 B2
(45) Date of Patent: Oct. 20, 2026

(54) METHOD AND APPARATUS FOR CONTROLLING VEHICLE PLATOON, MEDIUM, DEVICE, AND PROGRAM PRODUCT

(71) Applicant: Tencent Technology (Shenzhen) Company Limited, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 50 days.

(21) Appl. No.: 18/926,582

(22) Filed: Oct. 25, 2024

(65) Prior Publication Data

US 2025/0046193 A1 Feb. 6, 2025

Related U.S. Application Data

(63) Continuation of application No. PCT/CN2022/142408, filed on Dec. 12, 2022.

(30) Foreign Application Priority Data

May 20, 2022 (CN) ........................ 202210557229.X

(51) Int. Cl.
*G08G 1/00* (2006.01)
*B60W 30/16* (2020.01)
(Continued)

(52) U.S. Cl.
CPC ............... *G08G 1/22* (2013.01); *B60W 30/16* (2013.01); *B60W 60/001* (2020.02);
(Continued)

(58) Field of Classification Search
CPC ...... G08G 1/22; G08G 1/0116; G08G 1/0137; G08G 1/052; G08G 1/20; G08G 1/00;
(Continued)

(56) References Cited

U.S. PATENT DOCUMENTS 9,940,840 B1 * 4/2018 Schubert ................ G06Q 30/06
2014/0316865 A1 * 10/2014 Okamoto ............. G05D 1/0293
705/14.1
(Continued)

FOREIGN PATENT DOCUMENTS

CN 106600952 A * 4/2017 ............... G08G 1/22
CN 109552330 A 4/2019
(Continued)

OTHER PUBLICATIONS

Machine translation of CN 106600952 (Year: 2017).*
(Continued)

*Primary Examiner* — Anne Marie Antonucci
*Assistant Examiner* — Patrick Daniel Mohl
(74) *Attorney, Agent, or Firm* — Sughrue Mion, PLLC

(57) ABSTRACT

A method for controlling a vehicle platoon is disclosed. A computer device establishes a communication connection with a first vehicle that is a free vehicle not currently participating in a platoon. The computer device obtains vehicle status information of the first vehicle and platoon status information of one or more vehicle platoons. Based on the vehicle status information and the platoon status information, the computer device matches the first vehicle with a first target vehicle platoon. The computer device generates a first platoon control instruction based on a distance between the first vehicle and the first target vehicle platoon, the vehicle status information, and platoon status information of the first target vehicle platoon. The first vehicle is then instructed to join the first target vehicle platoon by transmitting the first platoon control instruction to at least one of the first target vehicle platoon or the first vehicle.

20 Claims, 4 Drawing Sheets

(51) Int. Cl.
*B60W 60/00* (2020.01)
*G08G 1/01* (2006.01)
*G08G 1/052* (2006.01)

(52) U.S. Cl.
CPC ......... *G08G 1/0116* (2013.01); *G08G 1/0137* (2013.01); *G08G 1/052* (2013.01); *G08G 1/20* (2013.01); *B60W 2520/00* (2013.01); *B60W 2554/802* (2020.02); *B60W 2556/45* (2020.02); *B60W 2756/10* (2020.02)

(58) Field of Classification Search
CPC ............... B60W 30/16; B60W 60/001; B60W 2520/00; B60W 2554/802; B60W 2556/45; B60W 2756/10; B60W 2556/65; B60W 30/165; G05D 1/02; H04W 4/44; H04W 4/46
See application file for complete search history.

(56) References Cited

U.S. PATENT DOCUMENTS

| | | | | |
|---|---|---|---|---|
| 2017/0349176 | A1* | 12/2017 | Alden | G05D 1/0217 |
| 2018/0210457 | A1 | 7/2018 | Smartt et al. | |
| 2019/0171227 | A1 | 6/2019 | Sujan et al. | |
| 2020/0193839 | A1 | 6/2020 | Kamata et al. | |
| 2020/0300649 | A1* | 9/2020 | Kim | G08G 1/096811 |
| 2021/0382492 | A1* | 12/2021 | Park | G08G 1/22 |
| 2022/0108618 | A1* | 4/2022 | Kumar | G08G 1/161 |
| 2023/0230487 | A1* | 7/2023 | Hong | H04W 4/46 701/2 |
| 2023/0297122 | A1* | 9/2023 | Song | G05D 1/0285 |
| 2023/0311871 | A1* | 10/2023 | Behringer | G08G 1/09623 701/93 |
| 2023/0311876 | A1* | 10/2023 | Okuda | B60W 30/16 701/70 |
| 2023/0316914 | A1* | 10/2023 | McLaine | G06F 3/013 701/117 |

FOREIGN PATENT DOCUMENTS

| | | | |
|---|---|---|---|
| CN | 111163438 | A | 5/2020 |
| CN | 111696340 | A | 9/2020 |
| CN | 113788030 | A | 12/2021 |
| CN | 114373322 | A | 4/2022 |
| WO | 2017/200433 | A1 | 11/2017 |

OTHER PUBLICATIONS

International Search Report for PCT/CN2022/142408 dated Mar. 23, 2023.
Written Opinion for PCT/CN2022/142408 dated Mar. 23, 2023.

* cited by examiner

METHOD AND APPARATUS FOR CONTROLLING VEHICLE PLATOON, MEDIUM, DEVICE, AND PROGRAM PRODUCT

CROSS-REFERENCE TO RELATED APPLICATIONS

This application is a continuation application of International Application No. PCT/CN2022/142408 filed on Dec. 27, 2022, which claims priority to Chinese Patent Application No. 202210557229.X, filed with the China National Intellectual Property Administration on May 20, 2022, the disclosures of each being incorporated by reference herein in their entireties.

FIELD

This application relates to the field of computers and communication technologies, and in particular, to a method and apparatus for controlling a vehicle platoon, a medium, a device, and a program product.

BACKGROUND

With the development and application of new technologies such as an autonomous driving technology, an information communication technology, and cloud computing, vehicles are increasingly quickly transformed from manually controlled mechanical products to intelligent products controlled by intelligent systems. Platooning of a plurality of vehicles is a key direction. Current platooning solutions may be based on single-vehicle intelligence, which can add a free vehicle in only a small range to a platoon, perform only static configuration of vehicle platoons, and may have low flexibility.

SUMMARY

Provided are a method and apparatus for controlling a vehicle platoon, a medium, a device, and a program product, which are capable of discovering free vehicles in a large range and may match a vehicle platoon for the free vehicles.

According to some embodiments, a method for controlling a vehicle platoon, performed by a computer device, includes: establishing a communication connection with a first vehicle, wherein the first vehicle is a free vehicle; obtaining vehicle status information of the first vehicle; obtaining at least one platoon status information of at least one vehicle platoon; matching a first target vehicle platoon of the at least one vehicle platoon with the first vehicle based on the vehicle status information and the at least one platoon status information; generating a first platoon control instruction based on: a first distance between the first vehicle and the first target vehicle platoon, the vehicle status information, and platoon status information of the first target vehicle platoon; and instructing the first vehicle to join the first target vehicle platoon based on transmitting the first platoon control instruction to at least one of the first target vehicle platoon or the first vehicle.

According to some embodiments, an apparatus for controlling a vehicle platoon includes: at least one memory configured to store computer program code; at least one processor configured to read the program code and operate as instructed by the program code, the program code including: processing code configured to cause at least one of the at least one processor to: establish a communication connection with a first vehicle, wherein the first vehicle is a free vehicle; and obtain vehicle status information of the first vehicle; obtaining code configured to cause at least one of the at least one processor to obtain at least one platoon status information of at least one vehicle platoon; first determination code configured to cause at least one of the at least one processor to match a first target vehicle platoon of the at least one vehicle platoon with the first vehicle based on the vehicle status information and the at least one platoon status information; and control code configured to cause at least one of the at least one processor to: generate a first platoon control instruction based on: a first distance between the first vehicle and the first target vehicle platoon, the vehicle status information, and platoon status information of the first target vehicle platoon; and instruct the first vehicle to join the first target vehicle platoon by transmitting the first platoon control instruction to at least one of the first target vehicle platoon or the first vehicle.

According to some embodiments, a non-transitory computer-readable storage medium, storing computer code which, when executed by at least one processor, causes the at least one processor to at least: establish a communication connection with a first vehicle, wherein the first vehicle is a free vehicle; obtain vehicle status information of the first vehicle; obtain at least one platoon status information of at least one vehicle platoon; match a first target vehicle platoon of the at least one vehicle platoon with the first vehicle based on the vehicle status information and the at least one platoon status information; generate a first platoon control instruction based on: a first distance between the first vehicle and the first target vehicle platoon, the vehicle status information, and platoon status information of the first target vehicle platoon; and instruct the first vehicle to join the first target vehicle platoon by transmitting the first platoon control instruction to at least one of the first target vehicle platoon or the first vehicle.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1:
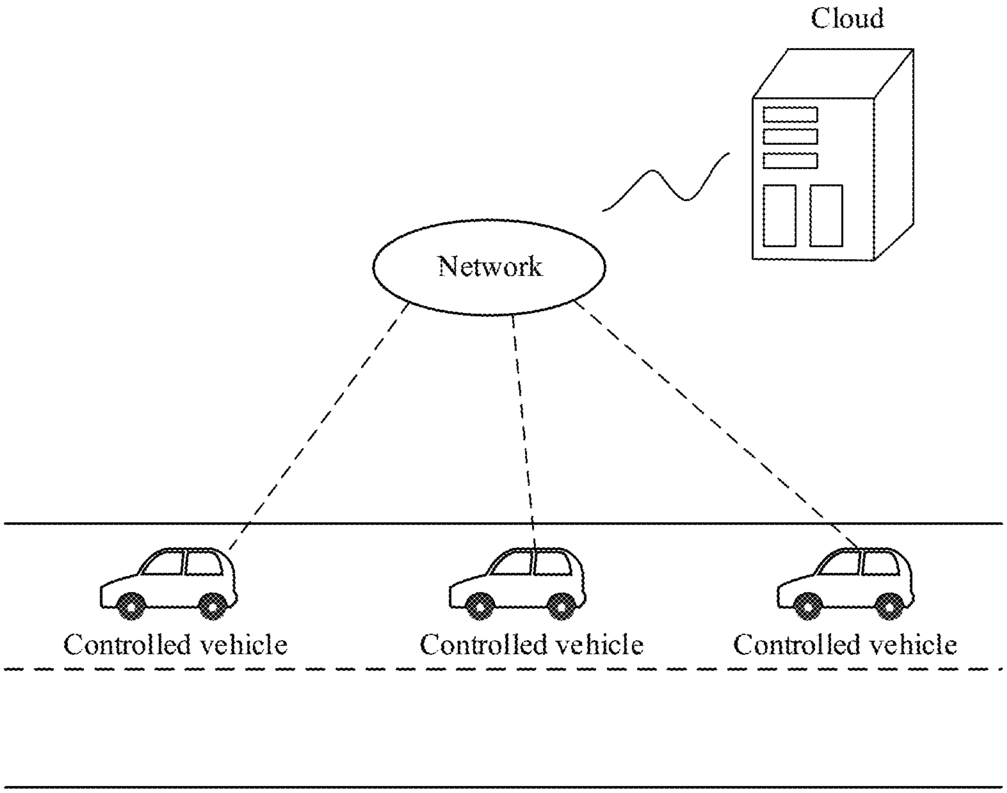
FIG. 1 is a schematic structural diagram of a system for controlling a vehicle platoon according to some embodiments.

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Provided are a method and apparatus for controlling a vehicle platoon, a medium, a device, and a program product. The method for controlling a vehicle platoon in some embodiments may be performed by a computer device. The computer device may be a device such as a terminal or a server. Some embodiments are applicable to various scenarios such as a cloud technology, artificial intelligence, intelligent traffic, and autonomous driving.

First, some terms used during description of some embodiments are explained as follows:

Intelligent traffic system (ITS for short): It is also referred to as an intelligent transportation system, which is a transportation system that may improve safety, improve efficiency, improve an environment, and save energy formed by applying advanced science and technologies (an information technology, a computer technology, a data communication technology, a sensor technology, an electronic control technology, an automatic control theory, operations research, artificial intelligence, and the like) to transportation, service control, and vehicle manufacturing and enhances connection among vehicles, roads, and users.

Intelligent vehicle infrastructure cooperative system (IVICS for short): It is referred to a vehicle infrastructure cooperative system for short, and is a development direction of the ITS. The IVICS is a safe, efficient, and environmentally friendly road traffic system that adopts technologies such as advanced wireless communication and a new generation of Internet to perform an omni-directional vehicle-vehicle and vehicle-infrastructure dynamic real-time information interaction and perform active safety control of vehicles and cooperative road management based on full-space-time dynamic traffic information collection and integration, to realize cooperation among people, vehicles, and roads, improve traffic safety, and improve traffic efficiency.

Intelligent traffic: It refers to making full use of new generation of information technologies such as the Internet of Things, space sensing, cloud computing, and mobile Internet in the whole transportation field, making use of theories and tools such as transportation science, system methods, artificial intelligence, and knowledge mining, and using sensing, deep integration, active service, and scientific decision-making as objectives, to establish a real-time dynamic information service system to deeply mine transportation-related data so as to form a problem analysis model, and may improve an industry resource allocation optimization capability, a public decision-making capability, an industry management capability, and a public service capability, promoting safer, more efficient, more convenient, more economical, more environmentally friendly, and more comfortable operation and development of transportation, and driving transformation and upgrade of transportation-related industries.

Autonomous driving technology: It usually includes technologies such as a high-precision map, environmental sensing, behavioral determination, path planning, and motion control. The autonomous driving technology has broad application prospects.

Platooning: It refers to enabling two or more vehicles to closely follow and be connected to each other based on a wireless communication technology and an autonomous driving technology to form a vehicle platoon with vehicles performing similar driving behaviors.

Driving as a platoon: It is a process of enabling two or more vehicles to travel in a form of a platoon in a scenario, which includes platooning behaviors such as creating a platoon, dismissing a platoon, joining a platoon, and leaving a platoon.

A vehicle platoon is a platoon formed by a plurality of vehicles. Four vehicle roles may exist in a vehicle platoon: a leading vehicle (LV), a following vehicle (FV), a tail vehicle, and a free vehicle.

Leading vehicle (LV for short): It is a frontmost vehicle of a platoon in a traveling direction of a platoon during driving as a platoon (refer to FIG. 3 in the following description), which is responsible for management of the entire platoon, for example, providing data transmission and management such as a vehicle location, path planning, and platoon process confirmation for an FV.

Following vehicle (FV for short): It is an FV in a platoon other than an LV during driving as a platoon, which is a component of a vehicle platoon.

Tail vehicle: It is the last car of a vehicle platoon and may be directly treated as an FV.

Free vehicle: It is a vehicle outside a vehicle platoon, which does not participate in a data interaction operation of the vehicle platoon.

Vehicle to vehicle (V2V) communication technology: It is a communication technology that is not limited to fixed base stations, which provides direct end-to-end wireless communication for a moving vehicle. Through the V2V communication technology, vehicle sides may directly exchange wireless information with each other without forwarding by a base station.

Advanced driving assistance system (ADAS for short): It is a system that senses a surrounding environment, collects data, performs identification, detection, and recognition on static and dynamic objects, and performs systematic calculation and analysis in combination with navigation map data in real time during vehicle traveling by using various sensors (such as a millimeter wave radar, a laser radar, a monocular or binocular camera, and a navigation satellite) mounted to a vehicle, to enable a driver to be aware of a potential danger in advance, and may improve comfort and safety of vehicle driving.

Cloud technology: It is a hosting technology that unifies a series of resources such as hardware, software, and a network in a wide area network or a local area network to realize calculation, storage, processing, and sharing of data. The cloud technology is a collective name of a network technology, an information technology, an integration technology, a platform management technology, an application technology, and the like based on application of business models for cloud computing. The technologies may form a resource pool for use on demand, which is flexible and convenient. A cloud computing technology may provide support. Backend services of a technology network system may require significant computing and storage resources, such as a video website, a picture website, and more portal websites. With the rapid development and application of the Internet industry, each item may have its own identification mark in the future, and the identification marks may be transmitted to a backend system for logical processing. Data of different levels is processed separately, and all kinds of industry data may require a strong system support, which can be achieved through the cloud computing.

Mobile edge computing (MEC for short): It is a technology that has an architecture evolving based on the 5th generation mobile communication technology (5G) and deeply fuses a mobile access network with Internet services. The MEC can provide, by using a wireless access network, nearby telecommunication users with services and cloud computing functions required by IT, to create a telecommunications level service environment with high performance, a low latency, and a high bandwidth, and may accelerate downloading of various contents, services, and applications in the network, and may further provide consumers with uninterrupted high-quality network experience. The MEC may improve user experience and save bandwidth resources, and may also provide unlimited possibilities for service innovation of a mobile edge entrance by sinking a computing capability to a mobile edge node and providing third-party application integration.

Platooning solutions may be based on single-vehicle intelligence, such as performing a sensing decision on a surrounding environment by using sensors mounted to a vehicle, which may only form a vehicle platoon with vehicles in a relatively small communication range. For example, only free vehicles in a ProSe Communication 5 (PC5) communication range may be added to the vehicle platoon. Static configuration of the vehicle platoon can be used, but flexible configuration cannot be performed based on factors such as an actual traveling route. Some embodiments provide a method and apparatus for controlling a vehicle platoon, a medium, a device, and a program product, which can discover free vehicles in a large range based on a cloud, and may match a vehicle platoon for the free vehicles. A control instruction is transmitted to a vehicle platoon and the free vehicles, to enable the free vehicles to join the vehicle platoon. Flexible configuration of vehicle platoons may be realized, and configuration flexibility of vehicle platoons may be improved.

FIG. 1 is a schematic structural diagram of a system for controlling a vehicle platoon according to some embodiments. The system for controlling a vehicle platoon includes a cloud, a controlled vehicle, and the like. The controlled vehicle is connected to the cloud through a network.

The controlled vehicle may be a free vehicle or any vehicle of the vehicle platoon, such as an LV or an FV. The controlled vehicle may be equipped with an on-board terminal, and is connected to the cloud through the on-board terminal. The controlled vehicle may be further equipped with an ADAS function. The cloud may be deployed in a central cloud or a MEC node. As the name suggests, an edge cloud server is a server located closer to an edge end. For example, the edge cloud server is arranged on a road side, to provide services for a nearby range, which increases a data responding speed. Different from the edge cloud server, a central cloud server is arranged on a distal end, which can provide services for a wider range.

In some embodiments, the controlled vehicle may communicate with a cloud platform through a base station. The base station may be a 5G base station, or may be a 3rd generation mobile communication technology (3G) or 4th generation mobile communication technology (4G) base station, or may be a next generation mobile communication base station.

In some embodiments, the controlled vehicle may interact with a roadside cloud platform through vehicle to everything (V2X) communication.

In some embodiments, during control of the controlled vehicle, the cloud may be configured to: establish communication connection with a first vehicle, and obtain vehicle status information of the first vehicle, the first vehicle being a free vehicle; obtain platoon status information of a vehicle platoon; determine a target vehicle platoon of the vehicle platoon matching the first vehicle based on the vehicle status information of the first vehicle and the platoon status information of the vehicle platoon; and generate a platoon control instruction based on a distance between the first vehicle and the target vehicle platoon, the vehicle status information of the first vehicle, and platoon status information of the target vehicle platoon, and transmit the platoon control instruction to at least one of the target vehicle platoon and the first vehicle, to instruct the first vehicle to join the target vehicle platoon. A description order of some embodiments is not a limitation or a preferred order of the embodiments.

Figure 2:
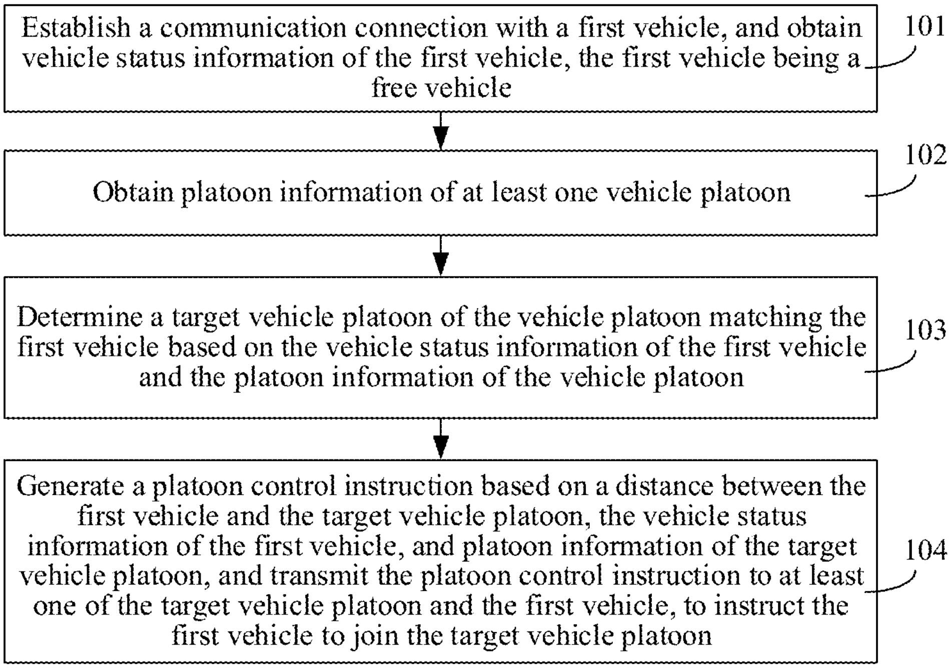
FIG. 2 is a schematic flowchart of a method for controlling a vehicle platoon according to some embodiments.

FIG. 2 is a schematic flowchart of a method for controlling a vehicle platoon according to some embodiments. The method for controlling a vehicle platoon is applicable to a cloud server. The method may include at least one of operation 101 to operation 104. A description is provided as follows:

101: Establish communication connection with a first vehicle, and obtain vehicle status information of the first vehicle, the first vehicle being a free vehicle.

In some embodiments, the vehicle status information is information configured for representing a vehicle status. The vehicle status includes but is not limited to a configuration status, a traveling status, and a location status of a vehicle. The vehicle status information may include configuration information, location information, traveling status information, and the like of the first vehicle. The configuration information may include information such as a vehicle brand, a model, a vehicle length, a load capacity, a color, an engine power, and a quantity of axles. The location information may include a location of the vehicle and road condition information of a road section where the vehicle is located. The traveling status information may include a speed, an acceleration, a heading angle, a platooning status, a role status, a traveling plan, a traveling destination, and the like of the vehicle. The first vehicle may be equipped with a plurality of types of sensors, such as a laser sensor, a visual sensor, a speed sensor, an acceleration sensor, a location sensor, and a radar. The first vehicle may detect data through the sensors, generate various vehicle status information based on the detected data, and may transmit the vehicle status information to the cloud server through a network. For example, the first vehicle detects speed data through the speed sensor, detects acceleration data through the acceleration sensor, and detects location data through the location sensor.

102: Obtain platoon status information of at least one vehicle platoon.

The cloud server may further establish communication connection with an LV of the vehicle platoon through the network, and obtain the platoon status information of the vehicle platoon transmitted by the LV. In some embodiments, the platoon status information of the at least one vehicle platoon is obtained. In some embodiments, platoon status information of a plurality of vehicle platoons is obtained. Neither a quantity of vehicle platoons nor a quantity of vehicle platoons from which platoon status information may be obtained is limited.

In some embodiments, the platoon status information is information configured for representing statuses of in-platoon vehicles of the vehicle platoon. The statuses of the in-platoon vehicles include but are not limited to a quantity, configuration statuses, traveling statuses, and location statuses of the in-platoon vehicles. The platoon status information may include configuration information, location information, and traveling status information of a plurality of in-platoon vehicles of the vehicle platoon. The configuration information of the in-platoon vehicles may include information such as a vehicle brand, a model, a vehicle length, a load capacity, a color, an engine power, and a quantity of axles of each in-platoon vehicle. The location information may include information such as a current location of the vehicle platoon, a current location of each in-platoon vehicle, and a road condition. The traveling status information may include a speed, a heading angle, a traveling plan, and a traveling destination of a current vehicle platoon and a platooning status, a role status, a traveling plan, a traveling destination, and the like of each in-platoon vehicle. The platoon status information may further include information about the vehicle platoon, such as a platoon identifier (identity, ID) of the vehicle platoon, the quantity of the in-platoon vehicles included in the vehicle platoon, and a capacity of the vehicle platoon.

The cloud server may be connected to a plurality of vehicle sides (free vehicles) through a network, and may determine a plurality of vehicle sides that can be driven as a platoon based on vehicle status information of the plurality of vehicle sides. The cloud server transmits a control instruction indicating driving as a platoon to the plurality of vehicle sides, to instruct the plurality of vehicle sides to form a vehicle platoon and be driven as a platoon. A capacity of the vehicle platoon may be preconfigured by the cloud server based on configuration information of the plurality of vehicle sides. For example, if the plurality of vehicle sides forming the vehicle platoon are a plurality of trucks, a capacity of the vehicle platoon may be relatively small in consideration of a communication range and safe driving.

In some embodiments, a traveling plan of the vehicle platoon may include a traveling path plan. The cloud server may receive the traveling path plan reported by an LV. The cloud server may obtain the traveling path plan of the vehicle platoon from a path planning server requested by the LV. For example, if the LV requests for a path to a destination from a server of a map application, the cloud server may obtain the traveling path plan of the LV through communication with the server.

In some embodiments, based on instructing the plurality of vehicle sides to form the vehicle platoon, the cloud server may plan, based on destination addresses reported by the vehicle sides, a path enabling arrival at a destination address of each vehicle side as the traveling path plan of the vehicle platoon.

103: Determine a target vehicle platoon of the vehicle platoon matching the first vehicle based on the vehicle status information of the first vehicle and the platoon status information of the vehicle platoon.

The cloud can process vehicle status information and platoon status information of vehicle platoons. The cloud may match a vehicle platoon for the free vehicle. A matching range is not limited to a PC5 communication range.

The vehicle status information may include vehicle configuration information, vehicle traveling status information, and vehicle location information, and the platoon status information includes platoon configuration information, platoon traveling status information, and platoon location information. Based on the vehicle platoon including a plurality of vehicle platoons, 102 may include: determining a distance between each of the plurality of vehicle platoons and the first vehicle based on the vehicle location information of the first vehicle and the platoon location information of the plurality of vehicle platoons; determining a vehicle platoon of the plurality of vehicle platoons at a distance from the first vehicle less than a first distance threshold as a first target vehicle platoon, the first target vehicle platoon including at least one candidate vehicle platoon; and determining the target vehicle platoon matching the first vehicle from the first target vehicle platoon based on platoon configuration information and platoon traveling status information of the first target vehicle platoon and the vehicle configuration information and the vehicle traveling status information of the first vehicle.

In some embodiments, the vehicle platoon at the distance from the first vehicle less than the first distance threshold may be determined as the first target vehicle platoon, and the target vehicle platoon matching the free vehicle may be determined from the first target vehicle platoon based on the platoon configuration information of the first target vehicle platoon. A target vehicle platoon to which the free vehicle is to be platooned may be a platoon relatively close to the free vehicle, which can reduce a time for vehicle platooning, and improve efficiency of vehicle platooning. Based on the platoon configuration information, the target vehicle platoon may match the free vehicle. Some embodiments may control a time and a matching degree.

The location information of the first vehicle may be reported by the first vehicle to the cloud server, or may be obtained by the cloud server based on received road sensing information. For example, the cloud server may obtain vehicle information sensed by a roadside sensing device (such as a camera), and may determine the location information of the first vehicle based on the vehicle information.

During vehicle platoon matching for the free vehicle, matching may be performed in a set distance range, and a long time required for the free vehicle to join the vehicle platoon may be avoided. The vehicle platoon of the plurality of vehicle platoons at the distance from the first vehicle less than the first distance threshold may be determined as the first target vehicle platoon. Matching may be performed on the candidate vehicle platoon of the first target vehicle platoon and the first vehicle, which may save processor resources and improve matching efficiency. The first distance threshold is not limited. The first distance threshold may be greater than a V2V communication range, and for example, may be the PC5 communication range. Vehicle platoon matching may be performed with the free vehicle in a large range.

In some embodiments, the "determining the target vehicle platoon matching the first vehicle from the first target vehicle platoon based on platoon configuration information and platoon traveling status information of the first target vehicle platoon and the vehicle configuration information and the vehicle traveling status information of the first vehicle" may include: determining a first candidate vehicle platoon as the target vehicle platoon if the vehicle configuration information of the first vehicle matches platoon configuration information of the first candidate vehicle platoon and the vehicle traveling status information of the first vehicle matches platoon traveling status information of the first candidate vehicle platoon, the first candidate vehicle platoon being any vehicle platoon of the vehicle platoon.

The vehicle configuration information may include information such as an engine frequency and a quantity of axles. A traveling speed range of the first vehicle may be determined based on the vehicle configuration information. The same is true for the platoon configuration information in some embodiments. The vehicle traveling status information may include destination information and traveling route information of the first vehicle. The platoon traveling status information may include final destination information and longest traveling route information of the vehicle platoon. Destination information of the LV of the vehicle platoon may be information about a furthest destination that arrived during the driving as a platoon of the vehicles, for example, the final destination information of the vehicle platoon, and a traveling route of the LV may be the longest route during the driving as a platoon of the vehicles. If an overlapping part exists between the traveling route information of the first vehicle and the longest traveling route information of the first candidate vehicle platoon and the traveling speed range of the first vehicle falls within a traveling speed range of the first candidate vehicle platoon, it may be considered that the vehicle configuration information of the first vehicle matches the platoon configuration information of the first candidate vehicle platoon and that the vehicle traveling status information of the first vehicle matches the platoon traveling status information of the first candidate vehicle platoon.

For example, if the first candidate vehicle platoon is in a range of two kilometers from the first vehicle, an overlapping part exists between the traveling route information of the first vehicle and the longest traveling route information of the first candidate vehicle platoon and the traveling speed range of the first vehicle falls within the traveling speed range of the first candidate vehicle platoon, the first candidate vehicle platoon may be determined as the target vehicle platoon matching the first vehicle.

In some embodiments, if the vehicle configuration information of the first vehicle matches the platoon configuration information of the first candidate vehicle platoon and the vehicle traveling status information of the first vehicle matches the platoon traveling status information of the first candidate vehicle platoon, the first candidate vehicle platoon is determined as the target vehicle platoon matching the first vehicle. During the matching, both the respective vehicle configuration information of the free vehicle and the vehicle platoon and whether forms and statuses of the free vehicle and the vehicle platoon are consistent may be considered. The free vehicle and the target vehicle platoon may have same or similar traveling speeds, traveling paths, traveling destinations, traveling habits, and the like. If the free vehicle and the vehicle platoon differ significantly, the free vehicle is significantly limited by the target vehicle platoon to which the free vehicle is platooned, which may lead to leaving of the vehicle. In some embodiments, during the platooning, contents including at least the configuration information and the traveling status information are considered, so that a high degree of matching can be achieved between the free vehicle and the target vehicle platoon to which the free vehicle is platooned, which may facilitate continuous and stable operation of the vehicles and the platoon.

In some embodiments, the method may further include: determining, if a plurality of candidate vehicle platoons of the first target vehicle platoon match the first vehicle, a candidate vehicle platoon of the plurality of candidate vehicle platoons at a shortest distance from the first vehicle as the target vehicle platoon.

The traveling speed range of the first vehicle may fall within traveling speed ranges of the plurality of candidate vehicle platoons, and an overlapping part may exist between the traveling route information of the first vehicle and the longest traveling route information of the plurality of candidate vehicle platoons. The candidate vehicle platoon at the shortest distance from the first vehicle may be determined as the target vehicle platoon and may reduce a time for the free vehicle to join the vehicle platoon.

In some embodiments, the candidate vehicle platoon of the plurality of candidate vehicle platoons at the shortest distance from the first vehicle may be determined as the target vehicle platoon, the first vehicle may join vehicle platoon matching the first vehicle within a shortest time and controlling a matching degree, and platooning efficiency may be improved.

In some embodiments, a candidate vehicle platoon of the plurality of candidate vehicle platoons on the same lane as the first vehicle may be determined as the target vehicle platoon. Lane changing of the vehicle may be avoided and may improve driving safety.

In some embodiments, vehicle matching degree information between the first vehicle and the plurality of candidate vehicle platoons is determined based on the vehicle status information of the first vehicle and the platoon status information of the vehicle platoon. In some embodiments, a larger matching degree between the vehicle status information of the first vehicle and the platoon status information of the vehicle platoon indicates a larger value of the vehicle matching degree information.

In some embodiments, distance matching degree information between the first vehicle and the plurality of candidate vehicle platoons is determined based on distance information between the first vehicle and the vehicle platoon. In some embodiments, a smaller distance indicates a larger value of the distance matching degree information.

In some embodiments, a weight of the vehicle matching degree information is a first value, and a weight of the distance matching degree information is a second value. A relationship between a magnitude of the second value and a magnitude of the second value is preset, or may be set by an owner of the first vehicle and transmitted to a computer device.

In some embodiments, matching degree information between the first vehicle and the plurality of candidate vehicle platoons is determined based on the vehicle matching degree information between the first vehicle and the plurality of candidate vehicle platoons, the weight corresponding to the vehicle matching degree information, the distance matching degree information between the first vehicle and the plurality of candidate vehicle platoons, and the weight corresponding to the distance matching degree information.

In some embodiments, the target vehicle platoon is determined from the plurality of candidate vehicle platoons based on a relationship between magnitudes of the matching degree information. In some embodiments, a candidate vehicle platoon corresponding to the matching degree information with the largest value is determined as the target vehicle platoon.

In some embodiments, different weights may be assigned to the vehicle matching degree information and the distance matching degree information, and different demands of the owner of the first vehicle may be be satisfied. If the owner indicates the vehicle matching degree is to have the highest priority and the distance matching degree is to have the secondary priority, the first value may be set to be greater than the second value. If the owner of the first vehicle is indifferent to the matching degree but wants to join the platoon, the second value may be set to be greater than the first value with the vehicle matching degree being controlled. In some embodiments, different weights may be assigned to the vehicle matching degree information and the distance matching degree information, and both the distance and the matching degree may be controlled, more diversified demands of the owner of the first vehicle may be satisfied, experience of the owner may be improved, and platooning manners may be enriched.

104: Generate a platoon control instruction based on a distance between the first vehicle and the target vehicle platoon, the vehicle status information of the first vehicle, and platoon status information of the target vehicle platoon, and transmit the platoon control instruction to at least one of the target vehicle platoon and the first vehicle, to instruct the first vehicle to join the target vehicle platoon.

In some embodiments, the vehicle traveling status information of the first vehicle includes a first traveling speed of the first vehicle, and the platoon traveling status information of the target vehicle platoon includes a second traveling speed of the target vehicle platoon. The "generating a platoon control instruction based on a distance between the first vehicle and the target vehicle platoon, the vehicle status information of the first vehicle, and platoon status information of the target vehicle platoon" may include: generating a first platoon control instruction based on the distance between the first vehicle and the target vehicle platoon, the first traveling speed, and the second traveling speed, the first platoon control instruction being configured for instructing at least one of the first vehicle and the target vehicle platoon to adjust the traveling speed, so that the distance between the first vehicle and the target vehicle platoon is less than a second distance threshold, the second distance threshold being less than the first distance threshold.

The second distance threshold is a maximum distance in which the first vehicle can directly communicate with the target vehicle platoon. Based on entering the range in which the first vehicle can directly communicate with the target vehicle platoon, the first vehicle may join the target vehicle platoon by using a PC5 mechanism.

In some embodiments, based on the first vehicle traveling to the communication range of the target vehicle platoon, the target vehicle platoon may broadcast a platoon message. Based on receiving the platoon message, the first vehicle may transmit a joining message to the cloud server through an A3 interface. The joining message may be configured for indicating that the first vehicle is to join the target vehicle platoon. The first vehicle may transmit a joining request message to the target vehicle platoon, set an own traveling status to a requesting state, and set a platoon ID of the requested platoon to be a platoon ID of the target vehicle platoon. In addition, the first vehicle may transmit the own traveling status to the cloud server. Based on receiving the joining request message, the target vehicle platoon may determine whether to allow the first vehicle to join the platoon. If the target vehicle platoon allows the first vehicle to join the platoon, the target vehicle platoon updates a platoon request status in platoon member management information to allowing to join the platoon, adds an FV ID to a platoon status information list in the management information, broadcasts the updated platoon status to the in-platoon vehicles, and transmits information to the first vehicle. Based on receiving the confirmation message, the first vehicle uploads the confirmation message to the cloud server. The cloud server may further determine a target location for the first vehicle to join the platoon, and generate a second platoon control instruction, so that the first vehicle travels to the target vehicle platoon based on the target location.

An LV of the target vehicle platoon may determine whether to allow the first vehicle to join the target vehicle platoon based on a capacity of the target vehicle platoon. Vehicle roles within the vehicle platoon may include an LV and FVs. The LV is at a frontmost location of the platoon. Limited by a communication range and a minimum spacing between vehicles, the LV cannot achieve a communication interaction with a tail vehicle based on a distance between the LV and the tail vehicle (the last vehicle of the platoon relative in a traveling direction of the platoon) exceeding a value. A quantity of vehicles of the platoon may be limited by the communication range of the LV. For example, if the remaining capacity of the target vehicle platoon is zero, the first vehicle is rejected to join the target vehicle platoon, which may avoid tardy communication as a result of exceeding the communication range of the target vehicle platoon and may improve the driving safety.

In some embodiments, the platoon status information of the target vehicle platoon includes spacing information between two adjacent in-platoon vehicles of the target vehicle platoon and destination information of each in-platoon vehicle of the target vehicle platoon. The "generating a platoon control instruction based on a distance between the first vehicle and the target vehicle platoon, the vehicle status information of the first vehicle, and platoon status information of the target vehicle platoon" may include: determining a target location for the first vehicle to join the target vehicle platoon based on the spacing information and the destination information of each in-platoon vehicle; and generating a second platoon control instruction based on the target location, the second platoon control instruction being configured for instructing the first vehicle to join the target vehicle platoon based on the target location.

The vehicle platoon includes a plurality of in-platoon vehicles, and a distance between two adjacent in-platoon vehicles may be determined based on the configuration information of the in-platoon vehicles. If the in-platoon vehicles are arranged densely, relatively large impact may be caused to other vehicles when a vehicle of the vehicle platoon leaves the platoon or when a vehicle joins the platoon. If the in-platoon vehicles are arranged sparsely, relatively small impact may be caused to other vehicles when a vehicle of the vehicle platoon leaves the platoon or when a vehicle joins the platoon. A location for the first vehicle to join the target vehicle platoon may be determined based on the distance between the in-platoon vehicles and may improve the driving safety and configuration flexibility of platoons. In some embodiments, the determining a target location for the first vehicle to join the target vehicle platoon based on the spacing information and the destination information of each in-platoon vehicle may include: determining a tail of the target vehicle platoon as the target location for the first vehicle to join the target vehicle platoon if the spacing information is less than a third distance threshold.

The third distance threshold is not limited. The third distance threshold may be determined based on the configuration information of the in-platoon vehicles of the target vehicle platoon. For example, if the in-platoon vehicles of the target vehicle platoon are big trucks, the third distance threshold may be set to be relatively large. If the in-platoon vehicles of the target vehicle platoon are sedan cars, the third distance threshold may be set to be relatively small.

If the spacing between the in-platoon vehicles of the target vehicle platoon is relatively small, the target location may be determined to be the tail of the target vehicle platoon, and traffic accidents during acceleration or deceleration of the in-platoon vehicles caused by the small spacing between the in-platoon vehicles may be avoided and may improve the driving safety.

In some embodiments, the method further includes: determining the target location for the first vehicle to join the target vehicle platoon based on the destination information of each in-platoon vehicle and destination information of the first vehicle if the spacing information is greater than or equal to the third distance threshold.

If the spacing between the in-platoon vehicles is relatively large, it may be considered that the in-platoon vehicles are arranged sparsely. The target location of the first vehicle is not limited. For example, the first vehicle may travel to the target vehicle platoon between any two in-platoon vehicles, or may travel to platoon at the tail.

The determining the target location for the first vehicle to join the target vehicle platoon based on the destination information of each in-platoon vehicle and destination information of the first vehicle may include: determining a leaving time of the first vehicle and a leaving time of each in-platoon vehicle based on the destination information of each in-platoon vehicle and the destination information of the first vehicle; and determining the target location based on the leaving time of the first vehicle and the leaving time of each in-platoon vehicle.

During formation of the target vehicle platoon, the in-platoon vehicles may be arranged based on the leaving time of each in-platoon vehicle. An in-platoon vehicle that is to leave the platoon earliest may be arranged at the tail of the platoon and may avoid impact on other in-platoon vehicles caused by the leaving. The target location for the free vehicle to join the platoon may be determined based on the leaving time, may avoid impact with other in-platoon vehicles, and may improve the driving safety.

In some embodiments, if the target location is at the tail of the target vehicle platoon, the generating a second platoon control instruction based on the target location may include: determining an instruction configured for instructing at least one of the first vehicle and the target vehicle platoon to adjust the traveling speed and instructing the first vehicle to join the target vehicle platoon at the tail as the second platoon control instruction.

For example, if the target vehicle platoon is located in front of the first vehicle, an instruction configured for instructing the first vehicle to accelerate and instructing the first vehicle to join the target vehicle platoon at the tail may be determined as the second platoon control instruction. If the target vehicle platoon is located in front of the first vehicle, an instruction configured for instructing the target vehicle platoon to decelerate and instructing the first vehicle to join the target vehicle platoon at the tail may be determined as the second platoon control instruction. If the target vehicle platoon is located in front of the first vehicle, an instruction configured for instructing the first vehicle to accelerate, instructing the target vehicle platoon to decelerate, and instructing the first vehicle to join the target vehicle platoon at the tail may be determined as the second platoon control instruction.

For example, if the target vehicle platoon is located behind the first vehicle, an instruction configured for instructing the first vehicle to decelerate and instructing the first vehicle to join the target vehicle platoon at the tail as the second platoon control instruction. If the target vehicle platoon is located behind the first vehicle, an instruction configured for instructing the target vehicle platoon to accelerate and instructing the first vehicle to join the target vehicle platoon at the tail may be determined as the second platoon control instruction. If the target vehicle platoon is located behind the first vehicle, an instruction configured for instructing the first vehicle to decelerate, instructing the target vehicle platoon to accelerate, and instructing the first vehicle to join the target vehicle platoon at the tail may be determined as the second platoon control instruction.

In some embodiments, if the target location is between any two adjacent in-platoon vehicles of the target vehicle platoon, the generating a second platoon control instruction based on the target location includes: determining an instruction configured for instructing the first vehicle to adjust the traveling speed, instructing an in-platoon vehicle located after the target location to adjust a traveling speed, and instructing the first vehicle to join the target vehicle platoon between any two adjacent in-platoon vehicles as the second platoon control instruction; or determining an instruction configured for instructing the first vehicle to adjust the traveling speed, instructing an in-platoon vehicle located before the target location to adjust a traveling speed, and instructing the first vehicle to join the target vehicle platoon between any two adjacent in-platoon vehicles as the second platoon control instruction; or determining an instruction configured for instructing the first vehicle to adjust the traveling speed, instructing the in-platoon vehicles located before and after the target location to respectively adjust the traveling speeds, and instructing the first vehicle to join the target vehicle platoon between any two adjacent in-platoon vehicles as the second platoon control instruction.

For example, if the target vehicle platoon is located in front of the first vehicle, an instruction configured for instructing the first vehicle to accelerate, instructing the in-platoon vehicle located after the target location to decelerate, and instructing the first vehicle to join the target vehicle platoon between any two adjacent in-platoon vehicles may be determined as the second platoon control instruction. If the target vehicle platoon is located in front of the first vehicle, an instruction configured for instructing the first vehicle to accelerate, instructing the in-platoon vehicle located before the target location to accelerate, and instructing the first vehicle to join the target vehicle platoon between any two adjacent in-platoon vehicles may be determined as the second platoon control instruction. If the target vehicle platoon is located in front of the first vehicle, an instruction configured for instructing the first vehicle to accelerate, instructing the in-platoon vehicle located before the target location to accelerate, instructing the in-platoon vehicle located after the target location to decelerate, and instructing the first vehicle to join the target vehicle platoon between any two adjacent in-platoon vehicles may be determined as the second platoon control instruction.

For example, if the target vehicle platoon is located behind the first vehicle, an instruction configured for instructing the first vehicle to decelerate, instructing the in-platoon vehicle located after the target location to decelerate, and instructing the first vehicle to join the target vehicle platoon between any two adjacent in-platoon vehicles may be determined as the second platoon control instruction. If the target vehicle platoon is located behind the first vehicle, an instruction configured for instructing the first vehicle to decelerate, instructing the in-platoon vehicle located before the target location to accelerate, and instructing the first vehicle to join the target vehicle platoon between any two adjacent in-platoon vehicles may be determined as the second platoon control instruction. If the target vehicle platoon is located behind the first vehicle, an instruction configured for instructing the first vehicle to decelerate, instructing the in-platoon vehicle located before the target location to accelerate, instructing the in-platoon vehicle located after the target location to decelerate, and instructing the first vehicle to join the target vehicle platoon between any two adjacent in-platoon vehicles may be determined as the second platoon control instruction.

The second platoon control instruction may further include an instruction configured for indicating lane changing, so that the first vehicle or the target vehicle platoon travels to a lane based on the instruction. The instruction configured for indicating lane changing may be configured for instructing the first vehicle to travel to the lane, and traffic from the in-platoon vehicles of the target vehicle platoon together performing lane changing may be avoided and may improve the driving safety.

Figure 3:
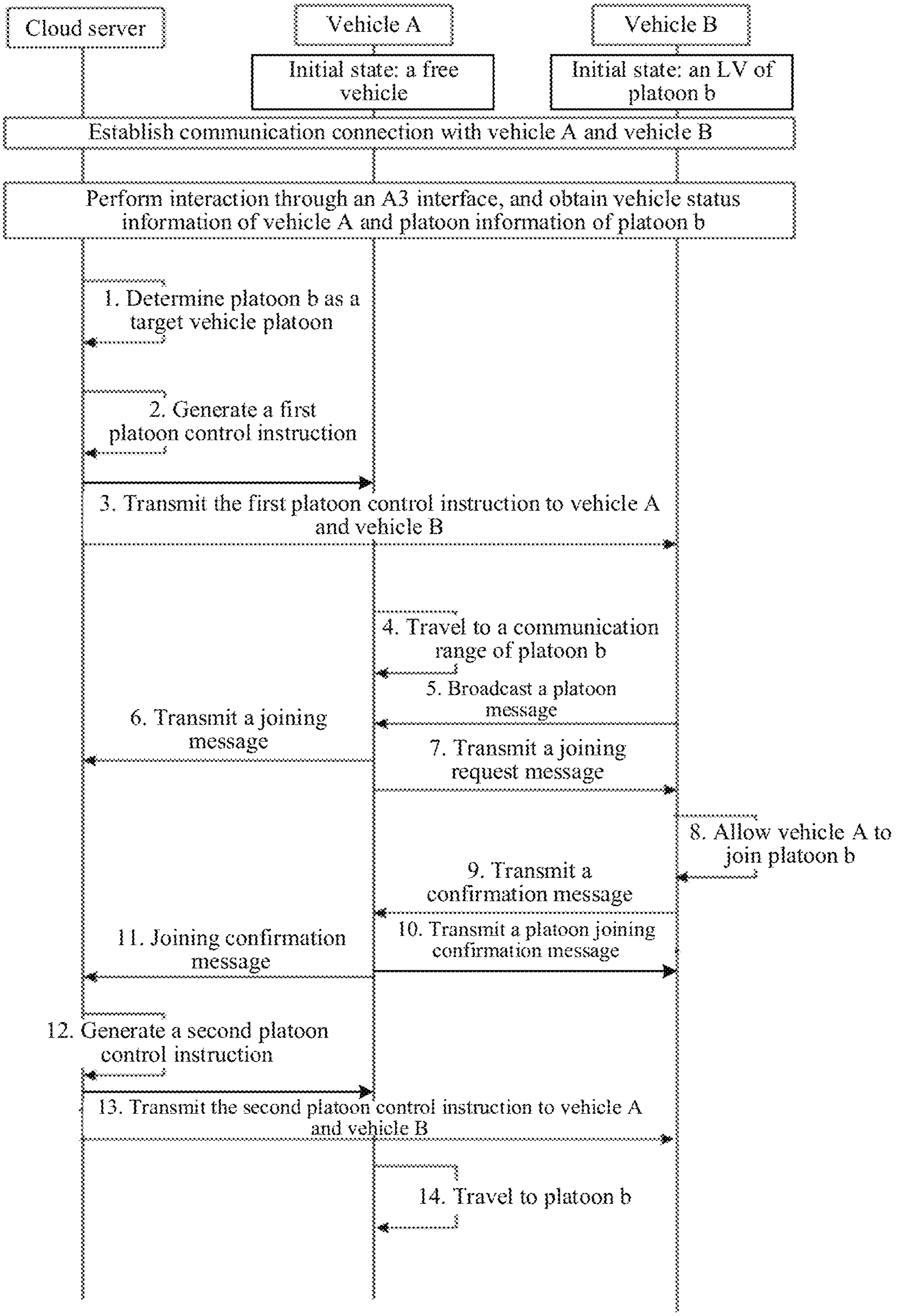
FIG. 3 is a diagram of a process of a method for controlling a vehicle platoon according to some embodiments.

To describe the method for controlling a vehicle platoon provided in some embodiments, referring to FIG. 3, a process, according to some embodiments, is described below in combination with a cloud server, a free vehicle, and an LV of a vehicle platoon.

In an initial state, vehicle A is the free vehicle, and vehicle B is an LV of a vehicle platoon b (which is referred to as a platoon b for short). Vehicle A and vehicle B establish network connection with the cloud server, and can interact with the cloud server through an A3 interface. Vehicle A may report vehicle status information to the cloud server, and vehicle B may report platoon status information of platoon b to the cloud server. For example, if a distance between vehicle A and vehicle B is less than a first distance threshold, and the vehicle status system information of vehicle A matches the platoon status information of platoon b, the cloud server determines platoon b as a target vehicle platoon (operation 1). The cloud server may generate a first platoon control instruction based on the vehicle status information of vehicle A and the platoon status information of platoon b (operation 2). The cloud server may transmit the first platoon control instruction to vehicle A and vehicle B, and vehicle A may travel to a direct communication range of platoon b (operations 3 and 4). Vehicle B may broadcast a platoon message, and vehicle A may transmit a joining message to the cloud server after receiving the platoon message (operation 5 and operation 6). Vehicle A may transmit a joining request message to vehicle B, and vehicle B may determine whether to allow vehicle A to join platoon b. If vehicle B determines to allow vehicle A to join platoon b, vehicle B transmits a confirmation message to vehicle A, and vehicle A transmits a platoon joining confirmation message to vehicle B, and transmits a joining confirmation message to the cloud server (operations 7 to 11). The cloud server may configure statuses of vehicle A and platoon b. The cloud server may generate a second platoon control instruction, and may transmit the second platoon control instruction to vehicle A and vehicle B, so that vehicle A travels to platoon b (operations 12 to 14).

Some embodiments may be formed by any combination of the technical solutions.

Some embodiments provide a method for controlling a vehicle platoon, including: establishing the communication connection with the first vehicle, and obtaining the vehicle status information of the first vehicle, the first vehicle being a free vehicle; obtaining the platoon status information of the vehicle platoon; determining the target vehicle platoon of the vehicle platoon matching the first vehicle based on the vehicle status information of the first vehicle and the platoon status information of the vehicle platoon; and generating the platoon control instruction based on the distance between the first vehicle and the target vehicle platoon, the vehicle status information of the first vehicle, and the platoon status information of the target vehicle platoon, and transmitting the platoon control instruction to at least one of the target vehicle platoon and the first vehicle, to instruct the first vehicle to join the target vehicle platoon. A connection may be established between the vehicle and the cloud, so that the cloud can discover free vehicles in a large range, may match a vehicle platoon for the free vehicles, and can transmit an instruction to the free vehicles or the vehicle platoon to instruct the free vehicles to join the vehicle platoon. Flexible configuration of vehicle platoons may be realized, and configuration flexibility of vehicle platoons may be improved.

The method, according to some embodiments, is described above. An apparatus, according to some embodiments, is described below with reference to FIG. 4. Some embodiments of the apparatus and method may correspond to each other, and for a similar description, reference may be made to the method.

Figure 4:
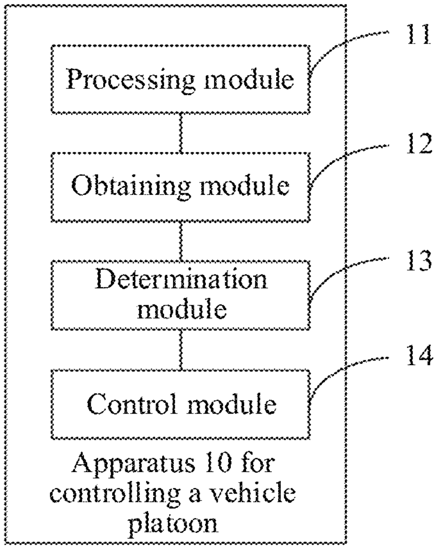
FIG. 4 is a schematic block diagram of an apparatus for controlling a vehicle platoon according to some embodiments.

FIG. 4 is a schematic block diagram of an apparatus 10 for controlling a vehicle platoon according to some embodiments. As shown in FIG. 4, the apparatus 10 for controlling a vehicle platoon may include:

- a processing module 11, configured to establish communication connection with a first vehicle, and obtain vehicle status information of the first vehicle, the first vehicle being a free vehicle;
- an obtaining module 12, configured to obtain platoon status information of at least one vehicle platoon;
- a determination module 13, configured to determine a target vehicle platoon of the vehicle platoon matching the first vehicle based on the vehicle status information of the first vehicle and the platoon status information of the vehicle platoon; and
- a control module 14, configured to generate a platoon control instruction based on a distance between the first vehicle and the target vehicle platoon, the vehicle status information of the first vehicle, and the platoon status information of the target vehicle platoon, and transmit the platoon control instruction to at least one of the target vehicle platoon and the first vehicle, to instruct the first vehicle to join the target vehicle platoon.

In some embodiments, the vehicle status information includes vehicle configuration information, vehicle traveling status information, and vehicle location information, and the platoon status information includes platoon configuration information, platoon traveling status information, and platoon location information. Based on the vehicle platoon including a plurality of vehicle platoons, the determination module 13 may be configured to: determine a distance between each of the plurality of vehicle platoons and the first vehicle based on the vehicle location information of the first vehicle and the platoon location information of the plurality of vehicle platoons; determine a vehicle platoon of the plurality of vehicle platoons at a distance from the first vehicle less than a first distance threshold as a first target vehicle platoon, the first target vehicle platoon including at least one candidate vehicle platoon; and determine the target vehicle platoon matching the first vehicle from the first target vehicle platoon based on platoon configuration information and platoon traveling status information of the first target vehicle platoon and the vehicle configuration information and the vehicle traveling status information of the first vehicle.

In some embodiments, the determination module 13 may be configured to determine a first candidate vehicle platoon as the target vehicle platoon if the vehicle configuration information of the first vehicle matches platoon configuration information of the first candidate vehicle platoon and the vehicle traveling status information of the first vehicle matches platoon traveling status information of the first candidate vehicle platoon, the first candidate vehicle platoon being any candidate vehicle platoon of the first target vehicle platoon.

In some embodiments, the determination module 13 may be configured to determine, if a plurality of candidate vehicle platoons of the first target vehicle platoon match the first vehicle, a candidate vehicle platoon of the plurality of candidate vehicle platoons at a shortest distance from the first vehicle as the target vehicle platoon.

In some embodiments, the vehicle traveling status information of the first vehicle includes a first traveling speed of the first vehicle, and the platoon traveling status information of the target vehicle platoon includes a second traveling speed of the target vehicle platoon. The control module 14 may be configured to generate a first platoon control instruction based on the distance between the first vehicle and the target vehicle platoon, the first traveling speed, and the second traveling speed, the first platoon control instruction being configured for instructing at least one of the first vehicle and the target vehicle platoon to adjust the traveling speed, so that the distance between the first vehicle and the target vehicle platoon is less than a second distance threshold, the second distance threshold being less than the first distance threshold.

In some embodiments, the platoon status information of the target vehicle platoon includes spacing information between two adjacent in-platoon vehicles of the target vehicle platoon and destination information of each in-platoon vehicle of the target vehicle platoon. The control module 14 may be further configured to: determine a target location for the first vehicle to join the target vehicle platoon based on the spacing information and the destination information of each in-platoon vehicle; and generate a second platoon control instruction based on the target location, the second platoon control instruction being configured for instructing the first vehicle to join the target vehicle platoon based on the target location.

In some embodiments, the control module 14 may be configured to determine a tail of the target vehicle platoon as the target location for the first vehicle to join the target vehicle platoon if the spacing information is less than a third distance threshold.

In some embodiments, the control module 14 may be further configured to determine the target location for the first vehicle to join the target vehicle platoon based on the destination information of each in-platoon vehicle and destination information of the first vehicle if the spacing information is greater than or equal to the third distance threshold.

In some embodiments, the control module 14 may be further configured to determine a leaving time of the first vehicle and a leaving time of each in-platoon vehicle based on the destination information of each in-platoon vehicle and the destination information of the first vehicle; and determine the target location based on the leaving time of the first vehicle and the leaving time of each in-platoon vehicle.

In some embodiments, if the target location is at the tail of the target vehicle platoon, the control module 14 may be further configured to determine an instruction configured for instructing at least one of the first vehicle and the target vehicle platoon to adjust the traveling speed and instructing the first vehicle to join the target vehicle platoon at the tail as the second platoon control instruction.

In some embodiments, if the target location is between any two adjacent in-platoon vehicles of the target vehicle platoon, the control module 14 may be further configured to: determine an instruction configured for instructing the first vehicle to adjust the traveling speed, instructing an in-platoon vehicle located after the target location to adjust a traveling speed, and instructing the first vehicle to join the target vehicle platoon between any two adjacent in-platoon vehicles as the second platoon control instruction; or determine an instruction configured for instructing the first vehicle to adjust the traveling speed, instructing an in-platoon vehicle located before the target location to adjust a traveling speed, and instructing the first vehicle to join the target vehicle platoon between any two adjacent in-platoon vehicles as the second platoon control instruction; or determine an instruction configured for instructing the first vehicle to adjust the traveling speed, instructing the in-platoon vehicles located before and after the target location to respectively adjust the traveling speeds, and instructing the first vehicle to join the target vehicle platoon between any two adjacent in-platoon vehicles as the second platoon control instruction.

For functions of the modules of the apparatus 10 for controlling a vehicle platoon in some embodiments, reference may be made to the method, according to some embodiments.

According to the apparatus 10 for controlling a vehicle platoon provided in some embodiments, the processing module 11 establishes the communication connection with the first vehicle, and obtains the vehicle status information of the first vehicle, the first vehicle being a free vehicle, the obtaining module 12 obtains the platoon status information of the vehicle platoon, the determination module 13 determines the target vehicle platoon of the vehicle platoon matching the first vehicle based on the vehicle status information of the first vehicle and the platoon status information of the vehicle platoon, and the control module 14 generates the platoon control instruction based on the distance between the first vehicle and the target vehicle platoon, the vehicle status information of the first vehicle, and the platoon status information of the target vehicle platoon, and transmits the platoon control instruction to at least one of the target vehicle platoon and the first vehicle, to instruct the first vehicle to join the target vehicle platoon. Flexible configuration of vehicle platoons may be realized, and configuration flexibility of vehicle platoons may be improved.

According to some embodiments, each module may exist respectively or be combined into one or more modules. Some modules may be further split into multiple smaller function modules and may implement the same operations without affecting the technical effects of some embodiments. The modules are divided based on logical functions. In actual applications, a function of one module may be realized by multiple modules, or functions of multiple modules may be realized by one module. In some embodiments, the apparatus may further include other modules. In actual applications, these functions may also be realized cooperatively by the other modules, and may be realized cooperatively by multiple modules.

A person skilled in the art would understand that these "modules" could be implemented by hardware logic, a processor or processors executing computer software code, or a combination of both. The "modules" may also be implemented in software stored in a memory of a computer or a non-transitory computer-readable medium, where the instructions of each unit are executable by a processor to cause the processor to perform the respective operations of the corresponding unit.

Some embodiments provide a computer device, including a memory and a processor, the memory having a computer program stored therein, and the processor implementing the method, according to some embodiments, when executing the computer program.

Figure 5:
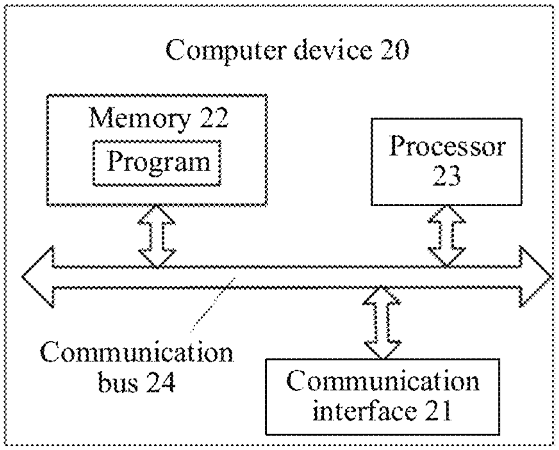
FIG. 5 is a schematic block diagram of a computer device according to some embodiments.

FIG. 5 is a schematic structural diagram of a computer device according to some embodiments. The computer device may be the server shown in FIG. 1. As shown in FIG. 5, a computer device 20 may include a communication interface 21, a memory 22, a processor 23, and a communication bus 24. The communication interface 21, the memory 22 and the processor 23 communicate with each other through the communication bus 24. The communication interface 21 may be configured for data communication between the computer device 20 and an external device. The memory 22 may be configured to store a software program and a module, and the processor 23 executes the software program and the module stored in the memory 22, for example, the software program of the corresponding operations in the method according to some embodiments.

In some embodiments, the processor 23 may invoke the software program and the module stored in the memory 22 to perform the following operations:

establishing communication connection with a first vehicle, and obtain vehicle status information of the first vehicle, the first vehicle being a free vehicle; obtaining platoon status information of a vehicle platoon; determining a target vehicle platoon of the vehicle platoon matching the first vehicle based on the vehicle status information of the first vehicle and the platoon status information of the vehicle platoon; and generating a platoon control instruction based on a distance between the first vehicle and the target vehicle platoon, the vehicle status information of the first vehicle, and platoon status information of the target vehicle platoon, and transmit the platoon control instruction to at least one of the target vehicle platoon and the first vehicle, to instruct the first vehicle to join the target vehicle platoon.

Some embodiments provide a computer-readable storage medium, which may be configured to store a computer program. The computer-readable storage medium is applicable to a computer device, and the computer program causes the computer device to implement corresponding processes of the method for controlling a vehicle platoon in some embodiments.

Some embodiments provide a computer program product, including a computer program, the computer program being stored in a computer-readable storage medium. A processor of a computer device reads the computer program from the computer-readable storage medium, and the processor executes the computer program, to cause the computer device to perform corresponding processes of the method for controlling a vehicle platoon in some embodiments.

Some embodiments provide a computer program, the computer program being stored in a computer-readable storage medium. A processor of a computer device reads the computer program from the computer-readable storage medium, and the processor executes the computer program, to cause the computer device to perform corresponding processes of the method for controlling a vehicle platoon in some embodiments.

The processor in some embodiments may be an integrated circuit chip, and has a signal processing capability. The operations in the method, according to some embodiments, may be implemented by using an integrated logic circuit of hardware in the processor or a computer program in a form of software. The processor may be a general-purpose processor, a digital signal processor (DSP for short), an application specific integrated circuit (ASIC for short), a field programmable gate array (FPGA for short) or another programmable logic device, a discrete gate or a transistor logic device, or a discrete hardware assembly. The processor can implement or perform the methods, the operations, and the logical block diagrams disclosed in some embodiments. The general-purpose processor may be a microprocessor, and the like. The operations of the methods disclosed with reference to some embodiments may be directly performed by a hardware decoding processor, or may be performed by a combination of hardware and software modules in the decoding processor. The software module may be located in a mature storage medium in the art, such as a random access memory (RAM), a flash memory, a read-only memory (ROM), a programmable read-only memory (PROM), an electrically erasable programmable memory (EEPROM), or a register. The storage medium is located in a memory. The processor reads information in the memory and completes the operations of the method, according to some embodiments, in combination with hardware thereof.

The memory in some embodiments may be a volatile memory or a nonvolatile memory, or may include both a volatile memory and a nonvolatile memory. The nonvolatile memory may be a ROM, a PROM, an erasable programmable read-only memory (EPROM for short), an EEPROM, or a flash memory. The volatile memory may be a RAM, and serves as an external cache. By way of example and not limitation, many forms of RAMs, such as a static random access memory (SRAM for short), a dynamic random access memory (DRAM for short), a synchronous dynamic random access memory (SDRAM for short), a double data rate synchronous dynamic random access memory (DDR SDRAM for short), an enhanced synchronous dynamic random access memory (ESDRAM for short), a synchlink dynamic random access memory (SLDRAM for short), and a direct rambus random access memory (DR RAM for short) may be used. The memories of the system and the method described herein are intended to include, but are not limited to, these memories and any other types of memories.

The memories are exemplary and are non-limiting. For example, the memory in some embodiments may be an SRAM, a DRAM, an SDRAM, a DDR SDRAM, an ESDRAM, an SLDRAM, or a DR RAM. The memories in some embodiments are intended to include, but are not limited to, these memories and any other types of memories.

A person of ordinary skill in the art may be aware that, units, algorithms, and operations described in some embodiments may be implemented by electronic hardware or a combination of computer software and electronic hardware. Whether the functions are performed by hardware or software depends on actual applications and design constraints. A person skilled in the art may use different methods to implement the described functions for each application, but it is not considered that such implementation goes beyond the scope of the disclosure.

A person skilled in the art can clearly understand that, for convenience and conciseness of description, for working processes of the above system, apparatus, and units, reference may be made to the corresponding processes in the method, according to some embodiments.

In some embodiments, the system, apparatus, and method may be implemented in another manner. For example, the apparatus, according to some embodiments, is an example. Division into the units is merely logical function division and may be other division during actual implementation. For example, a plurality of units or components may be combined or integrated into another system. In addition, the displayed or discussed mutual coupling or direct coupling or communication connection may be implemented through some interfaces. The indirect coupling or communication connection between the apparatuses or units may be implemented in an electronic, mechanical, or another form.

The units described as separate components may or may not be physically separated, and the components displayed as units may or may not be physical units, and may be located in one place or may be distributed over a plurality of network units. Some or all of the units may be selected based on actual demands to achieve the objectives of the solutions of the embodiments.

In addition, the functional units in some embodiments may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, some embodiments, in whole or in part, may be implemented in a form of a software product. The computer software product is stored in a storage medium, and includes a plurality of computer programs configured to enable a computer device (which may be a personal computer or a server) to perform all or a part of the operations of the method in some embodiments. The storage medium includes any medium that can store program code, such as a USB flash drive, a removable hard disk, a ROM, a RAM, a magnetic disk, or an optical disc.

In addition, the computer programs, computer instructions, computer code, and the like may be replaced with each other, which represent similar concepts. A form of the computer programs is not limited.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A method for controlling a vehicle platoon, performed by a computer device, comprising:

establishing a communication connection with a first vehicle, wherein the first vehicle is a free vehicle;

obtaining vehicle status information of the first vehicle;

obtaining at least one platoon status information of at least one vehicle platoon;

matching a first target vehicle platoon of the at least one vehicle platoon with the first vehicle based on the vehicle status information and the at least one platoon status information, wherein the at least one platoon status information includes spacing information between two adjacent vehicles of the first target vehicle platoon, and the spacing information indicates a distance between the two adjacent vehicles in the first target vehicle platoon;

generating a first platoon control instruction based on a first distance between the first vehicle and the first target vehicle platoon, the vehicle status information, and platoon status information of the first target vehicle platoon;

determining a target location for the first vehicle to join the first target vehicle platoon based on the spacing information;

generating a third platoon control instruction based on the target location; and instructing the first vehicle to join the first target vehicle platoon at the target location based on transmitting the first platoon control instruction and the third platoon control instruction to at least one of the first target vehicle platoon or the first vehicle.

2. The method according to claim 1, wherein the vehicle status information includes vehicle configuration information, vehicle traveling status information, and vehicle location information, wherein the platoon status information includes platoon configuration information, platoon traveling status information, and platoon location information; and wherein, based on the at least one vehicle platoon including a plurality of vehicle platoons, the matching the first target vehicle platoon comprises:

determining a plurality of distances between the plurality of vehicle platoons and the first vehicle based on the vehicle location information and first platoon location information of the plurality of vehicle platoons;

determining a second target vehicle platoon including at least one candidate vehicle platoon from the plurality of vehicle platoons based on a second distance between the second target vehicle platoon and the first vehicle being less than a first distance threshold; and matching the first target vehicle platoon with the first vehicle based on second platoon configuration information of the second target vehicle platoon, second platoon traveling status information of the second target vehicle platoon, the vehicle configuration information, and the vehicle traveling status information.

3. The method according to claim 2, wherein the matching the first target vehicle platoon with the first vehicle comprises:

determining a first candidate vehicle platoon of the at least one candidate vehicle platoon as the first target vehicle platoon based on matching the vehicle configuration information with third platoon configuration information of the first candidate vehicle platoon, and matching the vehicle traveling status information with third platoon traveling status information of the first candidate vehicle platoon.

4. The method according to claim 3, further comprising:

determining, based on a plurality of candidate vehicle platoons of the at least one candidate vehicle platoon matching the first vehicle, a second candidate vehicle platoon of the plurality of candidate vehicle platoons based on a shortest distance from the first vehicle as the first target vehicle platoon.

5. The method according to claim 2, wherein the vehicle traveling status information includes a first traveling speed of the first vehicle, wherein first platoon traveling status information of the first target vehicle platoon includes a second traveling speed of the first target vehicle platoon, wherein the generating the first platoon control instruction comprises generating a second platoon control instruction based on the first distance, the first traveling speed, and the second traveling speed, wherein the second platoon control instruction instructs at least one of the first vehicle to adjust the first traveling speed or the first target vehicle platoon to adjust the second traveling speed, such that the first distance is less than a second distance threshold, and wherein the second distance threshold is less than the first distance threshold.

6. The method according to claim 5, wherein the at least one platoon status information includes second destination information of a second plurality of vehicles of the first target vehicle platoon, and the determining the target location comprises determining the target location based on the spacing information and the second destination information.

7. The method according to claim 6, wherein the determining the target location comprises determining a tail of the first target vehicle platoon as the target location based on the spacing information being less than a third distance threshold.

8. The method according to claim 7, further comprising:

determining the target location based on the second destination information and first destination information of the first vehicle based on the spacing information being greater than or equal to the third distance threshold.

9. The method according to claim 8, wherein the determining the target location comprises:

determining a first leaving time of the first vehicle and a plurality of third leaving times of a third plurality of vehicles of the at least one vehicle platoon based on third destination information of the third plurality of vehicles and the first destination information; and determining the target location based on the first leaving time and the plurality of third leaving times.

10. The method according to claim 7, wherein based on the target location being the tail, the third platoon control instruction instructs at least one of:

the first vehicle to adjust the first traveling speed, or the first target vehicle platoon to adjust the second traveling speed, and the third platoon control instruction instructs the first vehicle to join the first target vehicle platoon at the tail.

11. An apparatus for controlling a vehicle platoon, the apparatus comprising:

at least one memory configured to store computer program code;

at least one processor configured to read the program code and operate as instructed by the program code, the program code comprising:

processing code configured to cause at least one of the at least one processor to:

establish a communication connection with a first vehicle, wherein the first vehicle is a free vehicle; and obtain vehicle status information of the first vehicle;

obtaining code configured to cause at least one of the at least one processor to obtain at least one platoon status information of at least one vehicle platoon;

first determination code configured to cause at least one of the at least one processor to match a first target vehicle platoon of the at least one vehicle platoon with the first vehicle based on the vehicle status information and the at least one platoon status information, wherein the at least one platoon status information includes spacing information between two adjacent vehicles of the first target vehicle platoon, and the spacing information indicates a distance between the two adjacent vehicles in the first target vehicle platoon; and control code configured to cause at least one of the at least one processor to:

generate a first platoon control instruction based on:

a first distance between the first vehicle and the first target vehicle platoon, the vehicle status information, and platoon status information of the first target vehicle platoon;

determine a target location for the first vehicle to join the first target vehicle platoon based on the spacing information;

generate a third platoon control instruction based on the target location; and instruct the first vehicle to join the first target vehicle platoon at the target location by transmitting the first platoon control instruction and the third platoon control instruction to at least one of the first target vehicle platoon or the first vehicle.

12. The apparatus according to claim 11, wherein the vehicle status information comprises:

vehicle configuration information, vehicle traveling status information, and vehicle location information, wherein the platoon status information comprises:

platoon configuration information, platoon traveling status information, and platoon location information; and wherein, the first determination code is configured to cause at least one of the at least one processor to, based on the at least one vehicle platoon comprising a plurality of vehicle platoons:

determine a plurality of distances between the plurality of vehicle platoons and the first vehicle based on the vehicle location information and first platoon location information of the plurality of vehicle platoons;

determine a second target vehicle platoon comprising at least one candidate vehicle platoon from the plurality of vehicle platoons based on a second distance between the second target vehicle platoon and the first vehicle being less than a first distance threshold; and match the first target vehicle platoon with the first vehicle based on:

second platoon configuration information of the second target vehicle platoon, second platoon traveling status information of the second target vehicle platoon, the vehicle configuration information, and the vehicle traveling status information.

13. The apparatus according to claim 12, wherein the first determination code is configured to cause at least one of the at least one processor to:

determine a first candidate vehicle platoon of the at least one candidate vehicle platoon as the first target vehicle platoon based on:

a first match of the vehicle configuration information with third platoon configuration information of the first candidate vehicle platoon, and a second match of the vehicle traveling status information with third platoon traveling status information of the first candidate vehicle platoon.

14. The apparatus according to claim 13, further comprising second determination code configured to cause at least one of the at least one processor to:

determine, based on a third plurality of matches of a plurality of candidate vehicle platoons of the at least one candidate vehicle platoon with the first vehicle, a second candidate vehicle platoon of the plurality of candidate vehicle platoons based on a shortest distance from the first vehicle as the first target vehicle platoon.

15. The apparatus according to claim 12, wherein the vehicle traveling status information comprises a first traveling speed of the first vehicle, wherein first platoon traveling status information of the first target vehicle platoon comprises a second traveling speed of the first target vehicle platoon, wherein the control code is configured to cause at least one of the at least one processor to generate a second platoon control instruction based on:

the first distance, the first traveling speed, and the second traveling speed, wherein the second platoon control instruction is configured to instruct at least one of the first vehicle to adjust the first traveling speed or the first target vehicle platoon to adjust the second traveling speed, such that the first distance is less than a second distance threshold, and wherein the second distance threshold is less than the first distance threshold.

16. The apparatus according to claim 15, wherein the at least one platoon status information further comprises:

second destination information of a second plurality of vehicles of the first target vehicle platoon, and wherein the control code is further configured to cause at least one of the at least one processor to:

determine the target location based on the spacing information and the second destination information.

17. The apparatus according to claim 16, wherein the control code is configured to cause at least one of the at least one processor to determine a tail of the first target vehicle platoon as the target location based on the spacing information being less than a third distance threshold.

18. The apparatus according to claim 17, wherein the control code is configured to cause at least one of the at least one processor to determine the target location based on the second destination information and first destination information of the first vehicle based on the spacing information being greater than or equal to the third distance threshold.

19. The apparatus according to claim 18, wherein the control code is configured to cause at least one of the at least one processor to:

determine a first leaving time of the first vehicle and a plurality of third leaving times of a third plurality of vehicles of the at least one vehicle platoon based on third destination information of the third plurality of vehicles and the first destination information; and determine the target location based on the first leaving time and the plurality of third leaving times.

20. A non-transitory computer-readable storage medium, storing computer code which, when executed by at least one processor, causes the at least one processor to at least:

establish a communication connection with a first vehicle, wherein the first vehicle is a free vehicle;

obtain vehicle status information of the first vehicle;

obtain at least one platoon status information of at least one vehicle platoon;

match a first target vehicle platoon of the at least one vehicle platoon with the first vehicle based on the vehicle status information and the at least one platoon status information, wherein the at least one platoon status information includes spacing information between two adjacent vehicles of the first target vehicle platoon, and the spacing information indicates a distance between the two adjacent vehicles in the first target vehicle platoon;

generate a first platoon control instruction based on:

a first distance between the first vehicle and the first target vehicle platoon, the vehicle status information, and platoon status information of the first target vehicle platoon;

determine a target location for the first vehicle to join the first target vehicle platoon based on the spacing information;

generate a second platoon control instruction based on the target location; and instruct the first vehicle to join the first target vehicle platoon at the target location by transmitting the first platoon control instruction and the second platoon control instruction to at least one of the first target vehicle platoon or the first vehicle.

* * * * *